(12) United States Patent
Wagenschein

(10) Patent No.: US 10,190,656 B2
(45) Date of Patent: Jan. 29, 2019

(54) METHOD AND DEVICE FOR BALANCING A WHEEL BY APPLICATION OF A HOT-MELT ADHESIVE BALANCING MASS

(71) Applicant: Wegmann automotive GmbH & Co. KG, Veitshöchheim (DE)

(72) Inventor: Dietmar Wagenschein, Vietshöchheim (DE)

(73) Assignee: WEGMANN AUTOMOTIVE GMBH & CO. KG, Veitshöchheim (DE)

( * ) Notice: Subject to any disclaimer, the term of this patent is extended or adjusted under 35 U.S.C. 154(b) by 0 days.

(21) Appl. No.: 15/148,636

(22) Filed: May 6, 2016

(65) Prior Publication Data

US 2016/0252159 A1 Sep. 1, 2016

Related U.S. Application Data

(63) Continuation of application No. PCT/EP2014/073822, filed on Nov. 5, 2014.

(30) Foreign Application Priority Data

Nov. 7, 2013 (EP) .................................... 13191968

(51) Int. Cl.
*F16F 15/34* (2006.01)
*F16F 15/32* (2006.01)
*C09J 9/00* (2006.01)

(52) U.S. Cl.
CPC ............. *F16F 15/324* (2013.01); *C09J 9/005* (2013.01); *F16F 15/32* (2013.01); *F16F 15/34* (2013.01); *F16F 15/345* (2013.01)

(58) Field of Classification Search
CPC ........ F16F 15/324; F16F 15/345; F16F 15/34; F16F 15/32; C09J 9/005
See application file for complete search history.

(56) References Cited

U.S. PATENT DOCUMENTS 4,532,164 A * 7/1985 Claunch, II ......... B29C 61/0625
156/49
4,895,551 A * 1/1990 Fritz ....................... F16C 3/026
464/180

(Continued)

FOREIGN PATENT DOCUMENTS

CN 101144518 A 3/2008
CN 101290039 A 10/2008

(Continued)

OTHER PUBLICATIONS

Office action in Chinese application No. 201480058764.4 dated Jan. 3, 2017.

(Continued)

*Primary Examiner* — Kip T Kotter
*Assistant Examiner* — Scott A Browne
(74) *Attorney, Agent, or Firm* — Norton Rose Fulbright US LLP

(57) ABSTRACT

Balancing weights for a rim of a vehicle wheel are made from a balancing weight material, which comprises a hot melt adhesive based on Polyolefins or Ethylene-vinyl acetate (EVA) copolymers filled with a volume ratio between 35% and 75% of a high-density mass material like steel particles. This balancing weight material is heated such that it becomes a ductile and adhesive material, which can adhere to the rim and applied to the rim. After cooling off a solid and fixedly attached balancing weight has been made.

16 Claims, 4 Drawing Sheets

(56) References Cited

U.S. PATENT DOCUMENTS

| | | | | | |
|---|---|---|---|---|---|
| 4,998,448 | A | * | 3/1991 | Ellis, Jr. | F16F 15/32 156/330 |
| 5,443,903 | A | * | 8/1995 | Hansen | C09J 9/005 428/350 |
| 6,581,444 | B2 | * | 6/2003 | Bal | G01M 1/326 301/5.21 |
| 2002/0194913 | A1 | | 12/2002 | Bal | 73/462 |
| 2004/0000214 | A1 | * | 1/2004 | Williams | F16F 15/322 464/180 |
| 2005/0004290 | A1 | * | 1/2005 | Kai | C08K 3/0033 524/406 |
| 2009/0001803 | A1 | * | 1/2009 | Taylor | F16F 15/328 301/5.21 |

FOREIGN PATENT DOCUMENTS

| | | | |
|---|---|---|---|
| EP | 1645776 | A1 | 4/2006 |
| EP | 1759893 | A1 | 3/2007 |
| JP | S58-200832 | | 11/1983 |
| JP | 3143813 | | 6/1994 |
| JP | H09-215263 | | 8/1997 |
| JP | 2004-084714 | | 3/2004 |
| JP | 2007-064275 | | 3/2007 |
| JP | 2010-520971 | | 6/2010 |
| WO | WO-02086347 | A1 * | 10/2002 ............ F16F 15/324 |

OTHER PUBLICATIONS

Office action in Japanese Patent Application No. 2016-528101 dated Apr. 3, 2017.
Decision to grant a European patent pursuant to Article 97(1) EPC in European Application No. 14793188.5 dated Dec. 15, 2016.
International Preliminary Report on Patentability in International Application No. PCT/EP2014/073822 dated May 10, 2016.
International Search Report and Written Opinion in International Application No. PCT/EP2014/073822 dated Jan. 13, 2015.

* cited by examiner

METHOD AND DEVICE FOR BALANCING A WHEEL BY APPLICATION OF A HOT-MELT ADHESIVE BALANCING MASS

PRIORITY CLAIM

This application is a continuation of pending International Patent Application No. PCT/EP2014/073822 filed on Nov. 5, 2014, which designates the United States and claims priority from European Patent Application No. 13191968.0 filed on Nov. 7, 2013, each of which is incorporated herein by reference in its entirety.

BACKGROUND OF THE INVENTION

1. Field of the Invention

The invention relates to a method for balancing a vehicle wheel as well as weights and materials for weights used in vehicle ballasting applications, and in particular to weights used in balancing automobile or other vehicle wheels.

2. Description of Relevant Art

In automotive wheel balancing, individual wheel balancing weights are applied to specific positions of a rim. Two types of balancing weights are used. The first kind is a balancing weight which is attached by a clamp, as disclosed in the European patent EP 1 613 876 B1, while the second kind is fixed by means of a self-adhesive tape, as disclosed in U.S. Pat. No. 6,364,421 B1.

Both kinds of balancing weights are available in a plurality of sizes, resulting in different weights. When balancing a vehicle wheel, the correct size of balancing weight is selected and then attached to the rim. Most balancing weights are supplied as bulk material in boxes, from which the required number of weights is manually taken. This allows for a simple, comparatively cheap supply of balancing weights.

The drawback is that the person who is taking the weights from the box may take a wrong weight, and therefore a further step of balancing is required. Further-more, the process of taking the weights can hardly be automated. For automation, comparatively complex feeder systems are known.

An alternative solution is disclosed in WO 2008/103651 A1. Here, a continuous rubber tape filled with a mass material is used. This has the drawback that the rubber tape is significantly less robust and more expensive than a solid balancing weight. Furthermore, an adhesive tape is required to hold the rubber tape to a rim.

A solution as provided in the yet undisclosed European patent application EP 12194092.8 does no more require such an adhesive tape. Here, an uncured/non-vulcanized viscoelastic polymer is fixed to a rim and cured afterwards. The uncured material has an adhesive, sticky surface, which is attached to a rim. By the curing process, the material polymerizes and its surface becomes less adhesive and less attractive to mud. A disadvantage is the adhesive surface of the uncured polymer, which is difficult to handle. Another disadvantage is the comparatively long curing time, which may last many days or weeks.

SUMMARY OF THE INVENTION

The embodiments are based on the object of providing a balancing weight body, which can be handled easily, and a method for balancing a wheel or any other rotating device using a balancing weight body, resulting in a very robust and long term stable balancing. Furthermore, the application of the balancing weight body should be quick, simple and inexpensive. A further problem to be solved is to provide a method for providing and/or manufacturing a balancing weight body.

In a first embodiment, a balancing weight material for manufacturing of balancing weights comprises a hot melt adhesive. The hot melt adhesive further comprises a filler of a high-density mass material. The high-density mass material may further comprise milled or grounded stainless steel particles with particle sizes with d50 values between 20 µm and 150 µm whereby the high-density mass material has a volume fraction between 35% and 75% relative to the balancing weight material. The balancing weight material has a first melting temperature, at which the balancing weight material gets an adhesive surface.

In a preferred embodiment, a balancing weight comprises a balancing weight material based on a hot melt adhesive filled with a mass material. Under ambient temperatures (e.g. standard temperature), the hot melt adhesive of the balancing weight material is comparatively stiff, often elastic and has a non-adhesive surface. When heated to a sufficient temperature, herein called the first melting temperature, the hot melt adhesive of the balancing weight material transforms and at least a part of its surface becomes adhesive. The hot melt adhesive preferably becomes at least in part ductile or even viscous. Preferably, the first melting temperature is higher than the bond-formation temperature, the minimum temperature below which wetting of the rim does not occur. Dependent on the hot melt adhesive material this temperature is in a range of 120° C. up to 210° C. For adhering the balancing weight material to a rim, such a heated balancing weight material is applied to the surface of the rim. There, the balancing weight material forms a reliable connection to the rim when cooling down to ambient temperature. After being cooled down, the balancing weight material forms a balancing weight adhering to the rim. The balancing weight material is at least essentially the same as before its application to the rim, but sticks to the rim.

Preferably, the whole balancing weight material, which is to be applied to the rim, may be heated. Thereby, stress cracks may be avoided. It may also be sufficient to heat the outer surface of the balancing weight material. Preferably, only at least one rim facing side may be heated until the at least one rim facing side becomes adhesive and the other side remains non-adhesive. Thereby, handling of the balancing weight material enhanced, when attaching it to the rim.

Summarizing, there are two successive phase changes of the hot melt adhesive of balancing weight material: First, i.e. prior to heating the balancing weight material has a non-adhesive surface. It is—depending on the hot melt material—preferably elastic. The hot melt material may be as well in a glass phase. Due to heating, the phase of at least a part of the hot melt material changes to a plastic, viscous or even liquid state. In any case, at least a part of the surface of the hot melt material becomes adhesive and sticky. One may consider this as an "adhesive state or "adhesive phase", what is strictly speaking not correct, but describes the essential effect. When applying the heated balancing weight material with its sticky, adhesive surface to a rim, the balancing weight material cools down due to the heat capacity and rather high heat conductivity of the rim. When cooling the balancing weight material down, the hot melt adhesive and undergoes a second phase transformation from the adhesive state back to its non-adhesive, i.e. initial state. Heating and cooling down may be obtained in a comparatively short period, which may be some seconds. Therefore, the two successive phase transformations can be achieved quickly, resulting in a quick application process of the balancing weight. Another advantage is the simplified handling of the balancing weight material before processing. There are no special measures necessary, as with the uncured polymer of EP 12194092.8, as the balancing weight material has no adhesive surface at ambient temperatures. Further, the hot melt material is long time stable and will not cure unintentionally, and thereby significantly change its chemical and thus physical properties.

Such a balancing weight has formed a robust and long term a stable bond to the rim. It will adhere to the mounting surface, e.g. rim almost over the lifetime of the wheel. The bond may only be degraded by high temperatures. Therefore, the hot melt adhesive of the balancing weight material will be selected such, that it can withstand the full operating temperature range of its application which may be a car or a wheel. Such a balancing weight may be removed by applying a high force like using a hammer or by heating the balancing weight preferably together with the rim to a comparatively high temperature to make the balancing weight material ductile or viscous and peeling the balancing weight material off the rim.

It is preferred, if a balancing weight material comprises a hot melt adhesive filled with a mass material. The hot melt adhesive may be based on at least one of Ethylene-vinyl acetate (EVA) copolymers, Ethylene-acrylate copolymers, Polyolefins (PO) (polyethylene (usually LDPE but also HDPE), atactic polypropylene (PP or APP), polybutene-1, oxidized polyethylene, etc.), Polybutene-1 and its copolymers, Amorphous polyolefin (APO/APAO) polymers, Thermoplastic polyurethane (TPU), Polyurethanes (PUR), or reactive urethanes, Styrene block copolymers (SBC), Styrene-butadiene-styrene (SBS), Styrene-isoprene-styrene (SIS), Styrene-ethylene/butylene-styrene (SEBS), Styrene-ethylene/propylene (SEP), Polycarbonates, Fluoropolymers, Silicone rubbers, Thermoplastic elastomers and various other copolymers. The preferred hot melt adhesives are at least one of Polyolefins and Ethylene-vinyl acetate (EVA) copolymers.

The mass material preferably has at least twice the density of the hot melt adhesive and may comprise at least one of steel, stainless steel, tungsten, zinc or zinc oxide any other suitable material, preferably in particles, most preferably having sizes with a d50 value below 150 µm and above 20 µm. The d50 value is the median diameter or the medium value of the particle size distribution. It is the value of the particle diameter at 50% in the cumulative distribution. It is further preferred to have a maximum particle size of 100 to 500 µm which is most preferably above the d50 value. A preferred mass material is stainless steel particles, preferably stainless steel scrap, which preferably is milled or grounded before use. Preferably, the particles are not ball or sphere shaped. Milled or grounded steel particles having a non-sphere shape and preferably edges or even spikes are more difficult to process than sphere shaped particles. Often they cause a higher wear of the tool or require more robust and therefore more expensive tools. But tests in different embodiments of balancing weights with different types of particles have shown a better long-time stability and therefore a higher quality, if milled or grounded particles are used. It is further preferred, if the material comprises a mixture of varying particle sizes. It is preferred to have a mixture of particles where the percentage of weight of particles of a specific mass increases with the size of the particles. Therefore, there is a higher percentage of weight in larger particles. In a preferred embodiment, the portion or percentage of mass M of a specific particle size d may be expressed by $$M(d)=(d/d_{max})^K$$

where $d_{max}$ is the maximum particle size and $d_{min} \leq d \leq d_{max}$ with $d_{min}$ being the minimum particle size. K is an exponent, which preferably is in a range of 0.1 to 0.6 and most preferably between 0.4 and 0.5. It is preferred to have 20 µm≤d≤150 µm.

Preferably, there is above 5% and below 75% in volume of mass material related to the total volume of the balancing weight material. The volume ratio may also be between 35% and 75%, preferably between 40% and 60% and most preferably 50%. By adding a higher percentage of mass material, the balancing weight material may be made more stiff and inflexible. Therefore, the mechanical properties may be adjusted by selecting the proper degree of mass material. In a further preferred embodiment, a further low-density material, which may comprise carbon particulates or carbon dust, may be added for further adjustment of mechanical properties without gaining too much weight. In general, the preferred range of density of the balancing weight material is between 3 and 6 g/cm³. The mechanical properties of the balancing weight material may be adjusted by mass material and low density material, such that the balancing weight material is comparatively stiff and solid. Furthermore, there may be added some dye for coloring the balancing weight material and giving the balancing weights a specific appearance.

The balancing weight material combines properties of a hot melt adhesive with a comparatively high mass of the mass material. The balancing weight material may be processed and applied to a mounting surface by similar machines and by using similar methods as processing standard hot melt adhesives. Such machines may be glue guns, extruders or similar devices. The balancing weight material may be delivered and fed into such machines for example in cartridges or for higher volumes in larger containers. In an alternate embodiment, the balancing weight material is mixed within the machine by mixing a hot-melt adhesive and a mass material before and preferably immediately before the application to a mounting surface.

The cold (unheated) balancing weight material at room temperature is comparatively stiff or solid due to the hot melt glue material. Therefore, before applying the balancing weight material to a rim, the balancing weight material has to be heated to get an adhesive surface and preferably to form a ductile and adhesive material. The required temperature, which must be reached at least at the surface of the balancing weight material is the melting temperature of the hot melt adhesive. Although not necessary, a further polymerization of the balancing weight material may be started or accelerated by the heat. In a next step, the heated balancing weight material is applied to a mounting surface e.g. a rim of a wheel. There, it may cool down, adhering to the rim. Alternatively, the balancing weight material may be placed on a rim and heated thereon. Such a heating on a rim may also be done indirectly by first heating the rim, which transfers its heat to the balancing weight material.

The desired amount of balancing weight material, which corresponds to the desired mass, may either be selected or cut from a longer strand before application, or the application process may be interrupted after the desired amount of balancing weight material has been applied.

It is obvious, that the embodiments are not limited to balancing weight for vehicles, although this is the preferred application. Instead, these balancing weights may be used everywhere, where an additional weight may be applied. Accordingly, the balancing weights may be applied to any mounting surface which allows adhering a hot-melt adhesive, like metal or plastic surfaces, which preferably are surfaces of a rim of a wheel.

A preferred method of application of the balancing weight material is by means of a glue gun. In a first embodiment, the balancing weight material is provided as a glue stick, which may be inserted into the glue gun. Here, the glue stick is transported through the glue gun, and a first section of the glue stick is heated to generate a ductile glue material, having an adhesive surface, which is dispensed by a nozzle of the glue gun. This balancing weight material can easily be applied to any desired location of a rim. On the comparatively cool surface of the rim, the hot balancing weight material cools down and glues to the rim surface, forming a balancing weight.

In an alternate embodiment, the balancing weight material may be provided as a continuous strand (or string), which for example may be stored on a roll. Such a strand may be fed into the glue gun. The strand may have a circular, elliptical or rectangular cross section. Preferably, the cross section corresponds to the shape of the balancing weight, which is to be made from the balancing weight material. The strand may be an extruded profile. The balancing weight material may also be delivered by cartridges, which preferably may be heated as a whole.

In a further embodiment, a glue gun may be provided, which has an internal extruder. This extruder may be fed by a granulated balancing weight material, which is heated, formed to a ductile mass and dispensed by a nozzle.

In another embodiment, a hot air gun or a similar device generating hot air may be used to heat the balancing weight and/or the rim. Basically, the rim may be sufficiently heated by any device or method and a cold piece of balancing weight material may be placed on the rim, being heated by the rim.

According to a further embodiment, a balancing weight application head may be provided which heats the balancing weight material and presses and/or locates the balancing weight material to the rim. Preferably, the balancing weight application head has a coil for inductively heating the rim in the close vicinity of where the balancing weight will be applied. Preferably, the application head or any means for applying the balancing weight is mounted to a robot. Alternatively, the application head may be fixed, while the mounting surface (e.g. rim) is moved.

The embodiments are not limited to a specific way of heating the balancing weight material, which may be made directly or indirectly although it is essential to heat the balancing weight material to adhere to the rim.

BRIEF DESCRIPTION OF THE DRAWINGS

In the following, the invention will be described by way of example, without limitation of the general inventive concept, on examples of embodiment and with reference to the drawings.

Figure 1:
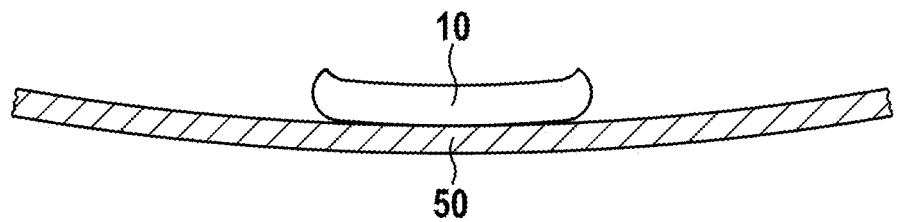
FIG. 1 shows a preferred embodiment of a balancing weight.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

In FIG. 1, a preferred embodiment is shown. A balancing weight 10 is located on a rim 50. The balancing weight comprises of balancing weight material as described herein which has been heated to achieve a reliable and long-term stable bond to the rim. Such a balancing weight may have been manufactured by using a hot melt gun.

Figure 2:
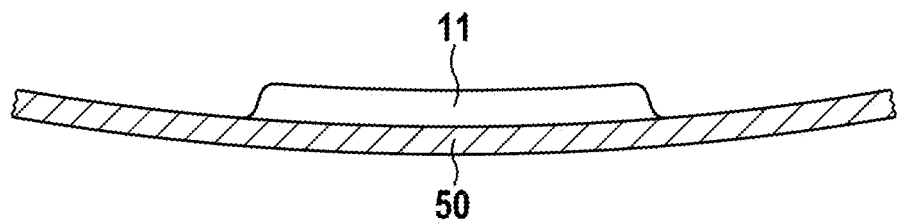
FIG. 2 shows another embodiment of a balancing weight.

In FIG. 2, another embodiment of a balancing weight is shown, which had been manufactured by cutting a strip of balancing weight material and heating the strip on the surface of the rim, for example by a hot air gun. This balancing weight has a smoother surface than the previous balancing weight.

Figure 3:
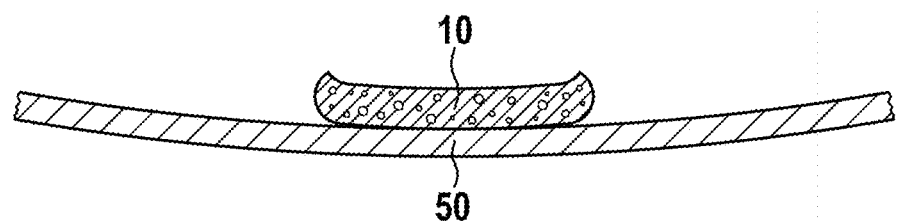
FIG. 3 shows a sectional view of the balancing weight of FIG. 1.

In FIG. 3, a sectional view of the balancing weight of FIG. 1 is shown. Preferably, there is a homogenous distribution of mass material particles in the hot melt adhesive.

Figure 4:
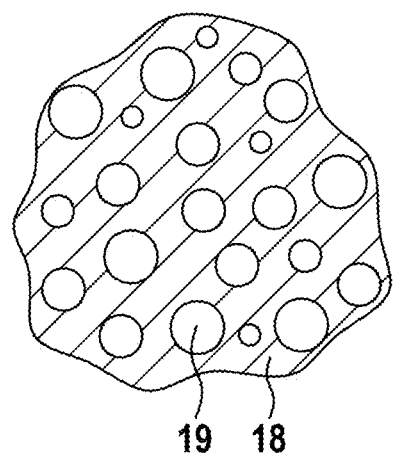
FIG. 4 shows an enlarged view of a section of a balancing weight.

In FIG. 4, an enlarged view of a section of a balancing weight is shown. Here, the hot melt adhesive 18 encloses the mass material 19, which comprises a plurality of particles, preferably having different sizes.

Figure 5:
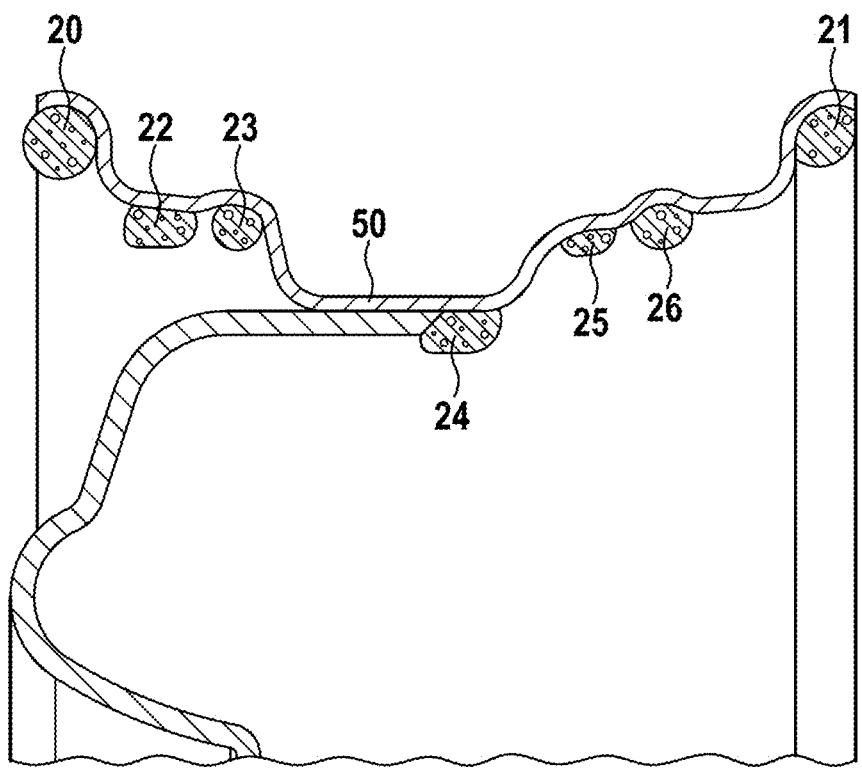
FIG. 5 shows a sectional view of the rim with balancing weights.

In FIG. 5, a sectional view of a rim 50 is shown with a selection of balancing weights at various locations. There may be balancing weights 20, 21 at the outmost edges of a rim. These are the same locations, where balancing weights usually are applied. Due to the adhesive properties and the simple application, balancing weights may also be applied to a broad variety of different locations like those shown with balancing weights 22, 23, 24, 25 and 26. Although this embodiment shows a steel rim, the balancing weights may be applied to many different locations other rims like aluminum rims.

Figure 6:
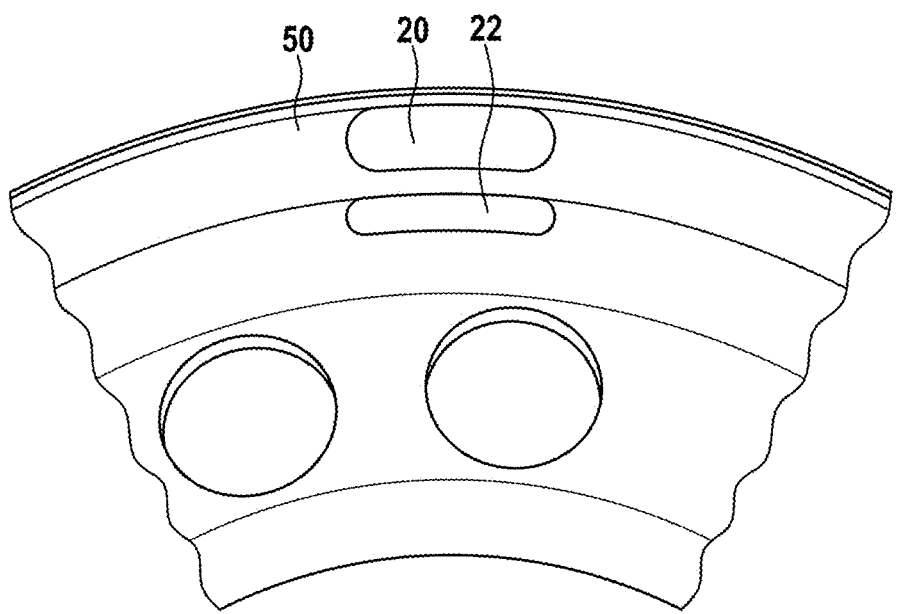
FIG. 6 shows a top view of a rim with balancing weights.

In FIG. 6, some of the previously shown balancing weights 20, 22 are shown in the top view of the rim 50.

Figure 7:
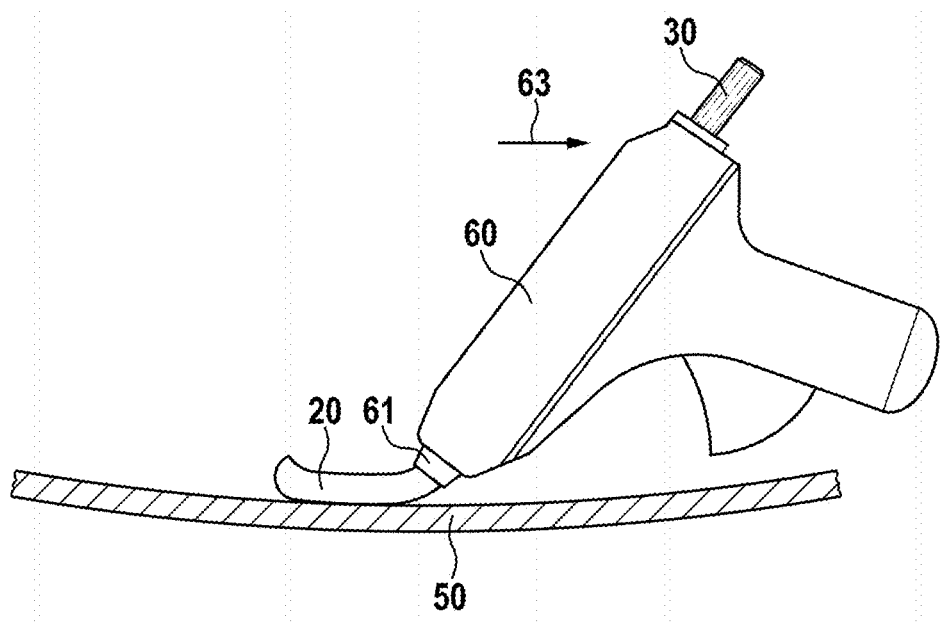
FIG. 7 shows the process of manufacturing a balancing weight by a hot melt gun.

In FIG. 7, the process of manufacturing a balancing weight by using a hot melt glue gun is shown. A hot melt glue gun 60 is fed with a balancing weight material stick 30. The balancing weight material is heated at the front end of the glue gun close to its nozzle 61 and pressed through the nozzle to form a hot balancing weight material strand on the rim 50. Synchronous with pressing the gun is moved into direction 63 to form a balancing weight. After cooling off, a balancing weight 20 is formed, adhering to the rim. Due to the high thermal conductivity of the rim, which usually is made of a metal, the strand cools off quickly, which may even occur within a few seconds.

Figure 8:
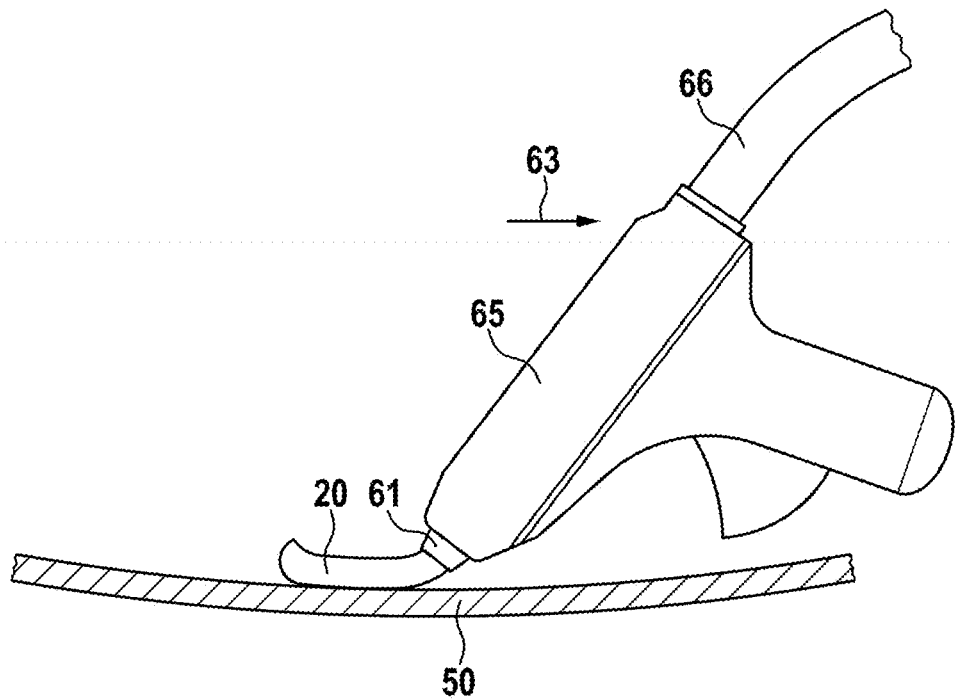
FIG. 8 shows the process of manufacturing a balancing weight by a hot melt gun fed by a pipe.

In FIG. 8, a similar process of manufacturing a balancing weight is shown as in the previous figure. Here, a different hot melt glue gun 65 is used. This hot melt glue gun is fed by a pipe delivering preferably a strand of balancing weight material or particles of balancing weight material.

Figure 9:
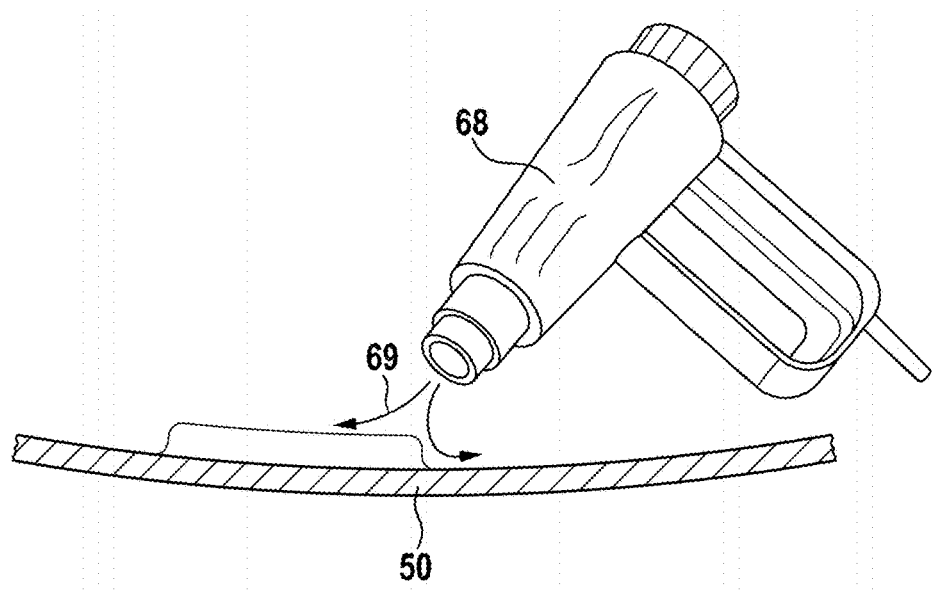
FIG. 9 shows the process of manufacturing a balancing weight by using a hot air gun.

In FIG. 9, the process of manufacturing a balancing weight by using a hot air gun or any similar device delivering hot air 69 is shown. Here, a piece or strand of balancing weight material of the appropriate size or mass is placed on the rim 50. Then the balancing weight material is heated by a hot air gun 68. Alternatively, the rim may be heated sufficiently for example by using the hot air gun. When a piece of balancing weight is placed on the hot rim, it also gets heated and starts adhering to the rim. This works even better, if both, the rim and the balancing weight material are heated before placing the balancing material on the rim. The disadvantage of heating the rim is the longer cooling off time due to the higher thermal capacity of the rim.

Figure 10:
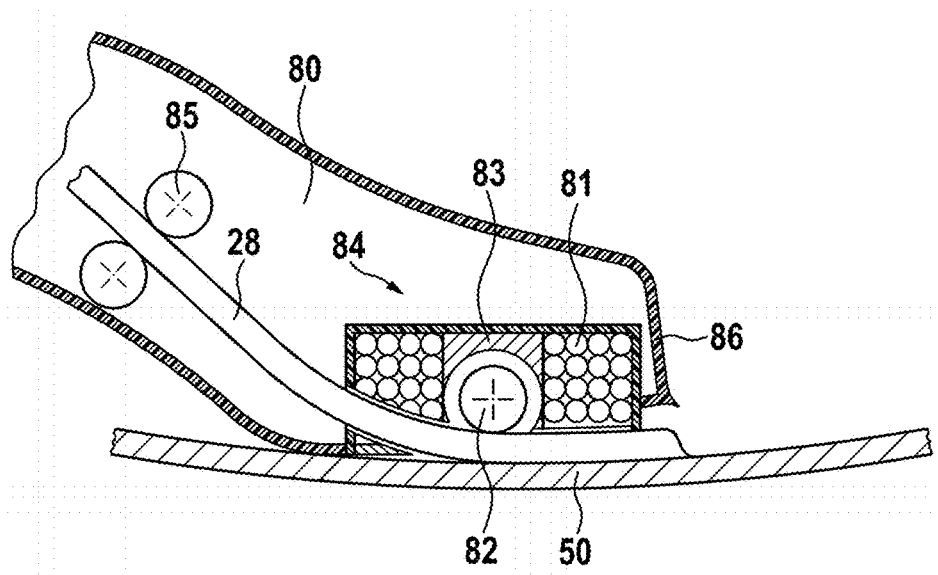
FIG. 10 shows a balancing weight application head.

In FIG. 10, a balancing weight application head 80 is shown. This balancing weight application head preferably is fed by a strand of balancing weight material 28. This strand of balancing weight materials may be guided by guiding rolls 85. It furthermore may be formed and/or pressed to the surface of a rim 50 by at least one roll 82. Preferably, in the close vicinity, where the balancing weight should adhere to the rim, and most preferably close to the roll 82 a heating element 84 is provided. Preferably in this has at least one coil 81 held by a spacer 83. This coil may be driven by an AC current, preferably from an AC source. The frequency of this AC current preferably is in the range of several kilohertz to several hundred kilohertz or even megahertz, generating eddy currents in the balancing weight material and/or rim and therefore heating the balancing weight material and/or rim. The balancing weight material may be heated from its interior, as the high-density mass material induces the highest eddy currents and therefore get hot, before the hot melt glue component gets heated. The form of the coil and the frequency of the AC current may be selected such, that either only the balancing weight material or the rim may be heated or at least a selective heating of the rim and/or balancing material is achieved. There may be a cutter 86 for cutting off the strand after the desired amount of balancing weight material has been applied.

It will be appreciated to those skilled in the art having the benefit of this disclosure that this invention is believed to provide balancing weights for vehicles and methods for application of such balancing weights. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 10, 11 balancing weight
18 hot melt adhesive
19 mass material
20-26 balancing weights
28 strand of balancing weight material
30 balancing weight material stick
50 mounting surface at a rim
60 hot melt glue gun
61 nozzle
63 direction of movement
65 hot melt glue gun
66 pipe
68 hot air gun
80 balancing weight application head
81 coil
82 pressure roll
84 heating element
86 cutter
88 spacer
85 guiding rolls

The invention claimed is:

1. Balancing weight material for manufacturing of balancing weights, the balancing weight material comprising:
a hot melt adhesive configured as a strand in a solid state prior to application of the hot melt adhesive to a rim, where
the hot melt adhesive comprises a filler of a high-density mass material,
the high-density mass material further comprises milled or ground stainless steel particles with particle sizes with d50 values between 20 μm and 150 μm,
the high-density mass material further has a volume fraction of between 35% and 75% relative to the balancing weight material,
the balancing weight material has a first melting temperature at which a surface of the balancing weight material will become adhesive, and
the balancing weight material is configured to be applied directly to the rim via a surface of the balancing weight material that has become adhesive to attach the balancing weight material to the rim.

2. Balancing weight material according to claim 1, wherein
the balancing weight material has the form of a strand.

3. Balancing weight material according to claim 1, wherein the hot melt adhesive comprises Polyolefins and/or Ethylene-vinyl acetate (EVA) copolymers.

4. Balancing weight material according to claim 1, wherein the hot melt adhesive comprises at least one component selected from the group consisting of: Ethylene-vinyl acetate (EVA) copolymers, Ethylene-acrylate copolymers, Polyolefins (PO) (polyethylene (usually LDPE but also HDPE), atactic polypropylene (PP or APP), polybutene-1, oxidized polyethylene, etc.), Polybutene-1 and its copolymers, Amorphous polyolefin (APO/APAO) polymers, Thermoplastic polyurethane (TPU), Polyurethanes (PUR), or reactive urethanes, Styrene block copolymers (SBC), Styrene-butadiene-styrene (SBS), Styrene-isoprene-styrene (SIS), Styrene-ethylene/butylene-styrene (SEBS), Styrene-ethylene/propylene (SEP), Polycarbonates, Fluoropolymers, Silicone rubbers, and Thermoplastic elastomers.

5. Balancing weight material according to claim 1, wherein the high-density mass material comprises a mixture of particles where the percentage of weight of particles of a specific mass increases with the size of the particles.

6. Balancing weight material according to claim 1, wherein a percentage of mass M of a specific particle size d is expressed by $$M(d) = \left(\frac{d}{d_{max}}\right)^K,$$

where $d_{max}$ is the maximum particle size of 150 μm, and $d_{min} \leq d \leq d_{max}$ with $d_{min}$ being the minimum particle size of 20 μm, and K being in a range of 0.1 to 0.6.

7. Balancing weight material according to claim 1, wherein the high-density mass material comprises stainless steel scrap.

8. Balancing weight material according to claim 1, wherein high-density mass material comprises at least one material selected from the group consisting of: steel, tungsten, zinc, and zinc oxide.

9. Method for the application of a balancing weight to a mounting surface of a rim, the method comprising the steps of:
   a) providing a balancing weight material comprising a hot melt adhesive configured as a strand in a solid state prior to application of the hot melt adhesive to the rim, the hot melt adhesive comprising a filler of a high-density mass material, the high-density mass material further comprising milled or ground stainless steel particles with particle sizes with d50 values between 20 μm and 150 μm, the high-density mass material further having a volume fraction of between 35% and 75% relative to the balancing weight material, and the balancing weight material having a first melting temperature at which a surface of the balancing weight material will become adhesive,
   b) heating the balancing weight material and/or the mounting surface to a temperature above the first melting temperature,
   c) applying the balancing weight material directly to the mounting surface such that the balancing weight material attaches to the mounting surface of the rim via a surface of the balancing weight material that has become adhesive, and
   d) cooling the balancing weight material to a temperature below the first melting temperature.

10. Method according to claim 9, wherein at least the surface of the balancing weight material to be applied to the mounting surface is heated to a temperature above the first melting temperature.

11. Method according to claim 9, wherein the entire balancing weight material is heated to a temperature above the first melting temperature.

12. Method according to claim 9, wherein the balancing weight material is heated by a hot glue gun or a hot air gun.

13. Method according to claim 9, wherein providing the balancing weight material in step a) comprises providing a required portion of the balancing weight material corresponding to a required weight.

14. Method according to claim 9, wherein applying the balancing weight material in step c) is stopped once a required portion of the balancing weight material corresponding to a required weight has been applied to the mounting surface.

15. The balancing weight applied to a mounting surface by the method of claim 9.

16. Device for applying a balancing weight by the method of claim 9, wherein the device comprises:
   a heating element configured to heat the balancing weight material and/or the mounting surface, the heating element comprising a coil that is configured to be driven by an AC current.

* * * * *